(12) United States Patent
Uetake et al.

(10) Patent No.: US 12,084,584 B2
(45) Date of Patent: Sep. 10, 2024

(54) AQUEOUS INK, INK CARTRIDGE AND INK JET RECORDING METHOD

(71) Applicant: CANON KABUSHIKI KAISHA, Tokyo (JP)

(72) Inventors: Yoko Uetake, Kanagawa (JP); Hiromitsu Kishi, Kanagawa (JP); Tetsuya Kosuge, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 262 days.

(21) Appl. No.: 17/542,548

(22) Filed: Dec. 6, 2021

(65) Prior Publication Data

US 2022/0186058 A1 Jun. 16, 2022

(30) Foreign Application Priority Data

Dec. 14, 2020 (JP) ................................ 2020-206947
Oct. 7, 2021 (JP) ................................ 2021-165638

(51) Int. Cl.
*C09D 11/322* (2014.01)
*B41J 2/175* (2006.01)
(Continued)

(52) U.S. Cl.
CPC ......... *C09D 11/322* (2013.01); *B41J 2/17503* (2013.01); *B41J 2/17513* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002;
(Continued)

(56) References Cited

U.S. PATENT DOCUMENTS 7,285,310 B2 10/2007 Kanke et al.
7,503,649 B2 3/2009 Kishi et al.
(Continued)

FOREIGN PATENT DOCUMENTS

JP 2007-099917 A 4/2007
JP 2011-174044 A 9/2011
JP 2012-072359 A 4/2012

*Primary Examiner* — Manish S Shah
(74) *Attorney, Agent, or Firm* — Venable LLP

(57) ABSTRACT

It is an object of the present invention to provide an aqueous ink for ink jet recording capable of recording a yellow image excellent in color developability and light resistance. An aqueous ink for ink jet recording contains a plurality of pigments and a resin dispersant. The plurality of pigments includes C.I. Pigment Yellow 74 and C.I. Pigment Yellow 138. A cumulative 50% particle diameter in volume-based particle size distribution of the C.I. Pigment Yellow 138 is 85 nm or less. A ratio of the cumulative 50% particle diameter in volume-based particle size distribution of the C.I. Pigment Yellow 138 to a cumulative 50% particle diameter in volume-based particle size distribution of the C.I. Pigment Yellow 74 is 0.72 times or less.

19 Claims, 2 Drawing Sheets

(51) Int. Cl.
  *B41J 2/21* (2006.01)
  *B41J 29/02* (2006.01)
  *B82Y 40/00* (2011.01)
  *C09D 11/107* (2014.01)
  *C09D 11/326* (2014.01)

(52) U.S. Cl.
  CPC .......... *B41J 2/1752* (2013.01); *B41J 2/17553* (2013.01); *B41J 2/2107* (2013.01); *B41J 29/02* (2013.01); *C09D 11/107* (2013.01); *C09D 11/326* (2013.01); *B82Y 40/00* (2013.01)

(58) Field of Classification Search
  CPC .... B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | |
|---|---|---|
| 7,976,148 B2 | 7/2011 | Kishi et al. |
| 8,389,600 B2 | 3/2013 | Suzuki et al. |
| 8,430,496 B2 | 4/2013 | Matsumoto et al. |
| 8,469,504 B2 | 6/2013 | Saito et al. |
| 8,636,350 B2 * | 1/2014 | Takayama ............ C09D 11/326 347/100 |
| 10,131,806 B2 | 11/2018 | Hayashi et al. |
| 11,072,720 B2 | 7/2021 | Furuse et al. |
| 2005/0052515 A1 * | 3/2005 | Udagawa ............... C09D 11/32 347/100 |
| 2009/0176071 A1 * | 7/2009 | Koganehira ......... C09D 11/326 524/588 |
| 2009/0286001 A1 * | 11/2009 | Kanke ................. C09D 11/101 522/167 |
| 2010/0034972 A1 | 2/2010 | Mukae et al. |
| 2011/0187786 A1 * | 8/2011 | Matsumoto .......... C09D 11/322 523/171 |
| 2012/0050383 A1 | 3/2012 | Takayama et al. |
| 2016/0280945 A1 | 9/2016 | Mukae et al. |
| 2020/0190344 A1 * | 6/2020 | Koyama ................ C09D 11/30 |
| 2021/0001636 A1 | 1/2021 | Okamura et al. |
| 2021/0002470 A1 | 1/2021 | Kishi et al. |
| 2021/0198504 A1 * | 7/2021 | Umesato ............. C09D 11/322 |
| 2021/0292577 A1 * | 9/2021 | Hayashi ............... B41J 2/17503 |

* cited by examiner

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

In recent years, there is a demand for improving the light resistance of an image recorded by an ink jet recording method. To meet the demand, as an ink capable of recording an image having excellent light resistance, the use of pigment ink containing a pigment as a coloring material is increasing. However, there is a problem that when a pigment ink is used as the coloring material, the color developability of the recorded image may be inferior to that when a dye ink containing a dye is used. For this reason, there is a demand for a pigment ink capable of recording an image having both excellent light resistance and color developability. In particular, there is a problem that compatibility between light resistance and color developability of an image obtained by a yellow ink containing a yellow pigment is difficult.

In order to solve the above problems, there has been proposed, for example, an ink in which C.I. Pigment Yellow 138 and C.I. Pigment Yellow 74 are used in combination and which can achieve both light resistance and color developability of an image (see Japanese Patent Application Laid-Open No. 2007-099917). An ink containing C.I. Pigment Yellow 74, C.I. Pigment Yellow 128 and multiple resins dispersing the pigments and capable of recording an image having improved light resistance, color developability and glossiness has also been proposed (see Japanese Patent Application Laid-Open No. 2011-174044). Further, an ink containing C.I. Pigment Yellow 74, C.I. Pigment Yellow 128, a specific surfactant and a specific organic solvent and capable of recording an image having improved light resistance, color developability and glossiness has been proposed (see Japanese Patent Application Laid-Open No. 2012-072359).

By using the inks proposed in Japanese Patent Application Laid-Open No. 2007-099917, Japanese Patent Application Laid-Open No. 2011-174044 and Japanese Patent Application Laid-Open No. 2012-072359, it is possible to record an image having improved color developability compared with an ink containing C.I. Pigment Yellow 138 or C.I. Pigment Yellow 128 alone as a coloring material. However, the color developability of the image recorded with the ink proposed in Japanese Patent Application Laid-Open No. 2007-099917, Japanese Patent Application Laid-Open No. 2011-174044 and Japanese Patent Application Laid-Open No. 2012-072359 did not reach the color developability of the image recorded with the ink containing only C.I. Pigment Yellow 74 as the coloring material. Also, there was a case that images using C.I. Pigment Yellow 138 and C.I. Pigment Yellow 74 together had lower light resistance than images using each light resistance alone.

Accordingly, it is an object of the present invention to provide an aqueous ink for ink jet recording capable of recording a yellow image excellent in color developability and light resistance. Another object of the present invention is to provide an ink cartridge and an ink jet recording method using the aqueous ink.

SUMMARY OF THE INVENTION

The present invention provides an aqueous ink for ink jet recording comprising a plurality of pigments and a resin dispersant for dispersing the plurality of pigments, wherein, the plurality of pigments comprises C.I. Pigment Yellow 74 and C.I. Pigment Yellow 138, a cumulative 50% particle diameter in volume-based particle size distribution of the C.I. Pigment Yellow 138 is 85 mu or less, and a ratio of the cumulative 50% particle diameter in volume-based particle size distribution of the C.I. Pigment Yellow 138 to a cumulative 50% particle diameter in volume-based particle size distribution of the C.I. Pigment Yellow 74 is 0.72 times or less.

According to the present invention, it is possible to provide an aqueous ink for ink jet recording capable of recording a yellow image excellent in color developability and light resistance. According to the present invention, an ink cartridge and an ink jet recording method using the aqueous ink can be provided.

Further features of the present invention will become apparent from the following description of exemplary embodiments with reference to the attached drawings.

BRIEF DESCRIPTION OF THE DRAWINGS

FIG. 2A is a perspective view of a main part of the ink jet recording apparatus FIG. 2B is a perspective view of a head cartridge.

DESCRIPTION OF THE EMBODIMENTS

Figure 1:
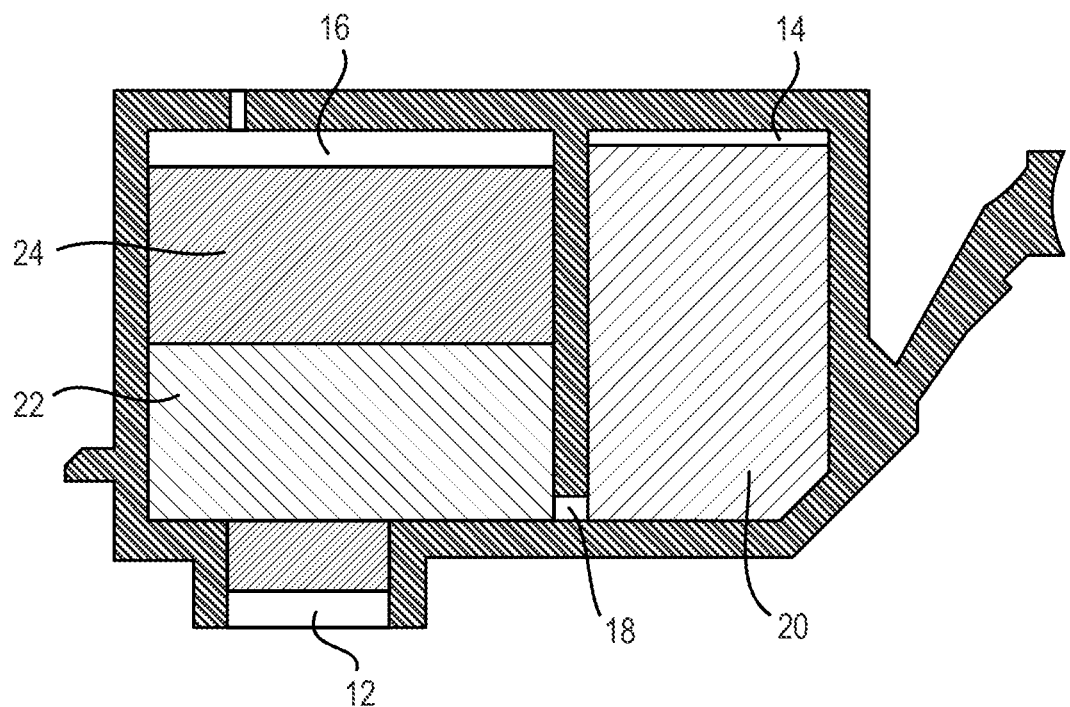
FIG. 1 is a sectional view schematically showing an embodiment of an ink cartridge of the present invention.

The present invention will now be described in detail with reference to preferred embodiments. In the present invention, when a compound is a salt, it is referred to as "comprising a salt" for convenience although the salt is dissociated into ions in an ink. Further, an aqueous ink for ink jet recording is sometimes simply referred to as an "ink". The physical properties are those at room temperature (25° C.) unless otherwise specified. "C.I." is an abbreviation of "color index".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In order to obtain an ink capable of recording an image excellent in color developability, it is preferable to use C.I. Pigment Yellow 74 having high color developability in terms of the features of the molecular structure and the hue angle. However, C.I. Pigment Yellow 74 is an organic pigment that is easily deteriorated by light because it has an azo bond which is easily cleaved by light in its molecular structure. Accordingly, the inventors of the present invention attempted to achieve both color developability and light resistance by using C.I. Pigment Yellow 138 having a molecular structure that is not easily deteriorated by light and having excellent light resistance in combination with C.I. Pigment Yellow 74. As a result, when the C.I. Pigment Yellow 138 and the C.I. Pigment Yellow 74 were used in combination, the color developability of the obtained image was lowered compared with the case of using the C.I.

Pigment Yellow 74 alone, as expected. Unexpectedly it was found that the light resistance of the resulting image was lowered when these pigments were used in combination compared to either C.I. Pigment Yellow 74 alone or C.I. Pigment Yellow 138 alone.

The density of C.I. Pigment Yellow 74 is about 1.44 g/cm³. On the other hand, the density of C.I. Pigment Yellow 138 is about 1.85 g/cm³. Therefore, when the particle diameters are equal, many of the particles of the C.I. Pigment Yellow 138 have a sedimentation velocity larger than that of the particles of the C.I. Pigment Yellow 74 on the recording medium applied with ink. When a resin dispersant commonly used for an aqueous ink for ink jet recording is used, the adsorption force of the resin dispersant to C.I. Pigment Yellow 74 is weaker than the adsorption force of the resin dispersant to C.I. Pigment Yellow 138. Therefore, the resin dispersant having dispersed the C.I. Pigment Yellow 74 tends to settle by being pulled by the C.I. Pigment Yellow 138. Therefore, when the C.I. Pigment Yellow 138 and the C.I. Pigment Yellow 74 are used together, the amount of the resin dispersant remaining in the vicinity of the surface of the recorded image is considered to be smaller than when only the C.I. Pigment Yellow 74 is used as the coloring material. When the amount of the resin dispersant remaining in the vicinity of the surface is small, the light resistance of the image is lowered. For the above reasons, it is considered that the light resistance of the image was lowered when C.I. Pigment Yellow 74 and C.I. Pigment Yellow 138 were used in combination as compared with the case where only one of C.I. Pigment Yellow 74 and C.I. Pigment Yellow 138 was used.

The present inventors further studied the particle diameter of C.I. Pigment Yellow 138. As a result, it was found that the light resistance was improved by setting the ratio of the cumulative 50% particle diameter in volume-based particle size distribution of the C.I. Pigment Yellow 138 to a cumulative 50% particle diameter in volume-based particle size distribution of the C.I. Pigment Yellow 74 to 0.72 times or less. The sedimentation velocity of a particle can be estimated by the Stokes equation which calculates the sedimentation velocity from the particle diameter and density. The density difference between C.I. Pigment Yellow 138 and C.I. Pigment Yellow 74 is about 0.41 g/cm³. If the particle diameter of the C.I. Pigment Yellow 138 having a large density is about 0.72 times larger than the particle diameter of the C.I. Pigment Yellow 74 having a small density, the sedimentation velocities of these pigments are equivalent. Therefore, the ratio of the cumulative 50% particle diameter in volume-based particle size distribution of the C.I. Pigment Yellow 138 to a cumulative 50% particle diameter in volume-based particle size distribution of the C.I. Pigment Yellow 74 is set to 0.72 times or less. With the above setting, the sedimentation velocity of the C.I. Pigment Yellow 138 tends to decrease, and the sedimentation velocity of the C.I. Pigment Yellow 138 hardly exceeds the sedimentation velocity of the C.I. Pigment Yellow 74.

Further, it was found to use C.I. Pigment Yellow 138 of which cumulative 50% particle diameter in volume-based particle size distribution is 85 nm or less with C.I. Pigment Yellow 74. As a result, the color developability (chroma C*) of the image was improved as compared with the case of using C.I. Pigment Yellow 74 alone. It is considered that, by decreasing the particle diameter of C.I. Pigment Yellow 138, the absorption of long-wavelength light by the C.I. Pigment Yellow 138 was suppressed, the absolute value of a* in the CIELab color space increased, and the value of chroma C* ($=\{(a^*)^2+(b^*)^2\}^{1/2}$) increased to improve the color developability.

<Ink>

An ink of the present invention is an aqueous ink for ink jet recording comprising a plurality of pigments and a resin dispersant for dispersing the plurality of pigments. The plurality of pigments comprises C.I. Pigment Yellow 74 and C.I. Pigment Yellow 138. A cumulative 50% particle diameter in volume-based particle size distribution of the C.I. Pigment Yellow 138 is 85 urn or less. And a ratio of the cumulative 50% particle diameter in volume-based particle size distribution of the C.I. Pigment Yellow 138 to a cumulative 50% particle diameter in volume-based particle size distribution of the C.I. Pigment Yellow 74 is 0.72 times or less. Since the ink of the present invention does not need to be an active energy ray curable type, it does not need to contain a monomer having a polymerizable group or the like. Hereinafter, the ink of the present invention will be described in detail.

(Pigment)

The plurality of pigments comprises C.I. Pigment Yellow 74 and C.I. Pigment Yellow 138. These pigments are dispersed in the ink by a resin dispersant. That is, the pigments used in the ink of the present invention are resin-dispersed pigments which are dispersed in the ink by the action of a resin as a resin dispersant.

A cumulative 50% particle diameter in volume-based particle size distribution of the C.I. Pigment Yellow 138 is 85 nm or less. The cumulative 50% particle diameter in volume-based particle size distribution of the C.I. Pigment Yellow 138 is preferably 30 urn or more to 60 nm or less and more preferably 40 nm or more to 60 nm or less. By setting the cumulative 50% particle diameter in volume-based particle size distribution of the C.I. Pigment Yellow 138 to the above-mentioned range, the color developability of the recorded image can be further improved. A cumulative 50% particle diameter in volume-based particle size distribution of the C.I. Pigment Yellow 74 is preferably 50 nm or more to 145 nm or less.

A ratio of the cumulative 50% particle diameter in volume-based particle size distribution of the C.I. Pigment Yellow 138 to the cumulative 50% particle diameter in volume-based particle size distribution of the C.I. Pigment Yellow 74 is 0.72 times or less. Further, the ratio of the cumulative 50% particle diameter in volume-based particle size distribution of the C.I. Pigment Yellow 138 to a cumulative 50% particle diameter in volume-based particle size distribution of the C.I. Pigment Yellow 74 is 0.50 times or more to 0.72 times or less. By setting the ratio of the cumulative 50% particle diameter in volume-based particle size distribution of the C.I. Pigment Yellow 138 to a cumulative 50% particle diameter in volume-based particle size distribution of the C.I. Pigment Yellow 74 to the above-mentioned range, the light resistance of the recorded image can be further improved.

A ratio of a cumulative 90% particle diameter in volume-based particle size distribution of the C.I. Pigment Yellow 138 to the cumulative 50% particle diameter in volume-based particle size distribution of the C.I. Pigment Yellow 138 is preferably 3.00 times or less. The above ratio is more preferably 1.50 times or more to 2.50 times or less. When the above ratio is more than 3.00 times, the proportion of particles of C.I. Pigment Yellow 138 having a sedimentation velocity exceeding C.I. Pigment Yellow 74 among all the particles of C.I. Pigment Yellow 138 becomes larger and the effect of improving the light resistance and color developability of an image may be slightly lowered. The cumulative 90% particle diameter in volume-based particle size distribution of the C.I. Pigment Yellow 138 is preferably 50 nm or more to 100 nm or less.

The cumulative 50% particle diameter (D50) and the cumulative 90% particle diameter (D90) in the volume-based particle size distribution of pigments such as C.I. Pigment Yellow 74 and C.I. Pigment Yellow 138 can be measured using a particle size distribution analyzer by a dynamic light scattering.

A content (% by mass) of the C.I. Pigment Yellow 74 based on the total mass of the ink is preferably 0.1% by mass or more to 8.0% by mass or less. A content (% by mass) of the C.I. Pigment Yellow 138 based on the total mass of the ink is preferably 0.1% by mass or more to 8.0% by mass or less. The ink may further contain a pigment other than C.I. Pigment Yellow 74 and C.I. Pigment Yellow 138. A total content (% by mass) of pigments based on the total mass of the ink is preferably 1.0% by mass or more to 10.0% by mass or less. A ratio of a content (% by mass) of the C.I. Pigment Yellow 138 to a content (% by mass) of the C.I. Pigment Yellow 74 is preferably 0.1 times or more to 10.0 times or less, more preferably 1.0 time or more to 5.0 times or less. When the above ratio is less than 0.1 times, the effect of improving the light resistance and color developability of an image may be slightly reduced. On the other hand, when the above ratio is more than 10.0 times, the influence of C.I. Pigment Yellow 74 having a smaller b* value than C.I. Pigment Yellow 138 becomes remarkable, and the b* value may be lowered to slightly reduce the effect of improving the color developability of the image.

(Resin Dispersant)

The ink comprises a resin dispersant for dispersing the pigments. As the resin dispersant, a general resin used for an aqueous pigment ink for ink jet recording can be used. Among them, acrylic resin is preferable. Examples of the resin dispersant include a resin dispersant which chemically bonds to a surface of a pigment particle and a microcapsule-type resin dispersant which covers a surface of a pigment particle, in addition to a resin dispersant which is physically adsorbed on a surface of a pigment particle and disperses the pigment in the ink.

Examples of an acrylic resin include a copolymer of a hydrophilic monomer and/or a hydrophobic monomer. Examples of the hydrophilic monomer include an acid monomer, a salt of the acid monomer, and a compound having a nonionic hydrophilic group (hydroxy group, amide group, etc.). Examples of the acid monomer and the salt of the acid monomer include such as an unsaturated carboxylic acid such as (meth) acrylic acid, maleic acid, itaconic acid and fumaric acid; a derivative thereof; and a salt thereof. Examples of the salt include a salt of alkali metal such as lithium, sodium, or potassium; ammonium salt; organic ammonium salt; and so on. Among them, (meth) acrylic acid and a salt of (meth) acrylic acid are preferable. The salt is preferably a sodium salt or a potassium salt.

Examples of the compound having a nonionic hydrophilic group include a (meth) acrylic acid hydroxyalkyl ester such as 2-hydroxyethyl (meth) acrylate or 3-methyl-5 hydroxypentyl (meth) acrylate; mono (meth) acrylates of polyalcohols such as ethylene glycol (meth) acrylates, polyethylene glycol (meth) acrylates; ethylene oxide added (meth) acrylate such as methoxyethylene glycol (meth) acrylate, alkoxypolyalkylene glycol (meth) acrylate, 2-phenoxyethylene glycol (meth) acrylate; (meth) acrylamide compounds such as methyl (meth) acrylamide, ethyl (meth) acrylamide; and so on.

Examples of the hydrophobic monomer include an α β-ethylenically unsaturated compound having an aryl group and an alkyl (meth) acrylate. Examples of the α,β-ethylenically unsaturated compound having an aryl group include an aromatic vinyl compound such as styrene and α-methylstyrene; an ester compound synthesized from an α,β-ethylenically unsaturated carboxylic acid, such as benzyl (meth) acrylate and 2-phenoxyethyl (meth) acrylate, and an alkyl alcohol having an aryl group. Among them, styrene and α-methylstyrene are preferable.

Examples of alkyl (meth) acrylate include methyl (meth) acrylate, ethyl (meth) acrylate, n-propyl (meth) acrylate, isopropyl (meth) acrylate, n-butyl (meth) acrylate, isobutyl (meth) acrylate, tert-butyl (meth) acrylate, 2-ethylhexyl (meth) acrylate lauryl (meth) acrylate, cyclohexyl (meth) acrylate, isobornyl (meth) acrylate, tricyclodecanedimethanol di (meth) acrylate and the like. The acrylic resin may be in any form of a random copolymer, a block copolymer, a graft copolymer, and a gradient copolymer.

A total content (% by mass) of resin dispersant based on the total mass of the ink is preferably 0.1% by mass or more to 15.0% by mass or less. The weight average molecular weight of the resin used as the resin dispersant is preferably 1,000 or more to 30,000 or less and more preferably 3,000 or more to 15,000 or less. The term "weight average molecular weight of a resin" as used herein means a value in terms of polystyrene as measured by gel permeation chromatography (GPC).

The resin dispersant preferably contains a resin A for dispersing C.I. Pigment Yellow 74 and a resin B for dispersing C.I. Pigment Yellow 138. A ratio of a weight average molecular weight of the resin B to a weight average molecular weight of the resin A is preferably 1.0 time or more, more preferably 1.0 time or more to 1.5 times or less, and still more preferably 1.1 times or more to 1.5 times or less. When the above ratio is less than 1.0 time, the entanglement between resins is less and the C.I. Pigment Yellow 138 tends to enter the gap of the C.I. Pigment Yellow 74 on the recording medium. As a result, the Pigment Yellow 138 tends to be disposed in the vicinity of the surface of the recording medium, and the effect of improving the color developability and the light resistance of the image may be slightly reduced. The resin A and the resin B may be the same or different. "Resins are the same" means that the compositions of the resins are identical and the physical properties of the resins are identical as well. "Resins are different" means that at least one of the compositions of the resins and the physical properties of the resins is different.

The acid value of the resin is preferably 120 mg KOH/g or more to 350 mg KOH/g or less. The ratio of the acid value (mg KOH/g) of the resin B for dispersing the C.I. Pigment Yellow 138 to the acid value (mg KOH/g) of the resin A for dispersing the C.I. Pigment Yellow 74 is preferably 1.0 time or more. The above ratio is more preferably 1.0 time or more to 1.5 times or less, still more preferably 1.1 times or more to 1.5 times or less. Here the case where the ratio of the cumulative 50% particle diameter in volume-based particle size distribution of the C.I. Pigment Yellow 138 to a cumulative 50% particle diameter in volume-based particle size distribution of the C.I. Pigment Yellow 74 is 0.72 times or less is discussed. In this case, the surface area per unit mass of the C.I. Pigment Yellow 138 is larger than that of the C.I. Pigment Yellow 74. Therefore, when the above ratio is less than 1.0 time, the charge amount per surface area of the C.I. Pigment Yellow 138 is less than that of the Pigment Yellow 74, and the repulsion due to the charge of the C.I. Pigment Yellow 138 is slightly weak. Accordingly, the C.I. Pigment Yellow 138 easily enters the gap of the C.I. Pigment Yellow 74 on the recording medium, and the Pigment Yellow 138 tends to be arranged near the surface of the recording medium. As a result, the effect of improving the color developability and the light resistance of the image may be slightly reduced.

(Aqueous Medium)

The ink is an aqueous ink containing at least water as an aqueous medium. The ink may further contain a water-soluble organic solvent as an aqueous medium. As the water, deionized water or ion-exchanged water is preferably used. The content (% by mass) of water in the ink is preferably 50.0% by mass or more to 95.0% by mass or less based on the total mass of the ink. As the water-soluble organic solvent, any one generally used for an ink can be used. Examples include alcohols, (poly) alkylene glycols, glycol ethers, nitrogen-containing compounds, sulfur-containing compounds, and the like. The content (% by mass) of the water-soluble organic solvent in the ink is preferably 3.0% by mass or more to 50.0% by mass or less based on the total mass of the ink.

(Other Additives)

The ink may contain a water-soluble organic compound which is solid at room temperature, such as polyalcohols such as trimethylolpropane or trimethylolethane, a urea derivative such as urea or ethylene urea, or the like, in addition to the components described above. Further, the ink may optionally contain a variety of additives such as surfactant, pH adjuster, rust inhibitor, preservative, fungicide, antioxidant, reduction inhibitor, evaporation promoter, chelating agent, and other resin.

<Ink Cartridge>

The ink cartridge is provided with an ink and an ink storage portion storing the ink. The ink stored in the ink storage portion is the aqueous ink of the present invention described above. FIG. 1 is a sectional view schematically showing an embodiment of an ink cartridge of the present invention. As shown in FIG. 1, an ink supply port 12 for supplying an ink to a recording head is provided on the bottom of the ink cartridge. The inside of the ink cartridge is an ink storage portion for storing ink. The ink storage portion comprises an ink storage chamber 14 and an absorber storage chamber 16, which communicate with each other via a communication port 18. The absorber storage chamber 16 communicates with the ink supply port 12. Liquid ink 20 is stored in the ink storage chamber 14, and absorbers 22 and 24 for holding the ink in an impregnated state are stored in the absorber storage chamber 16. The ink storage portion may be configured to hold the entire amount of ink stored therein by an absorber without having an ink storage chamber for storing liquid ink. Alternatively, the ink storage portion may be configured to hold the entire amount of ink stored in a liquid state without having an absorber. Further, the ink cartridge may be configured to have the ink storage portion and a recording head.

The ink jet recording method of the present invention is a method of recording an image on a recording medium by ejecting the aqueous ink of the present invention described above from an ink jet recording head. Examples of a method for ejecting ink include a method for imparting mechanical energy to ink and a method for imparting thermal energy to ink. In the present invention, it is particularly preferable to employ a method of ejecting ink by imparting thermal energy to the ink. As long as the ink of the present invention is used, any known process for the ink jet recording method is available.

Figure 2A:
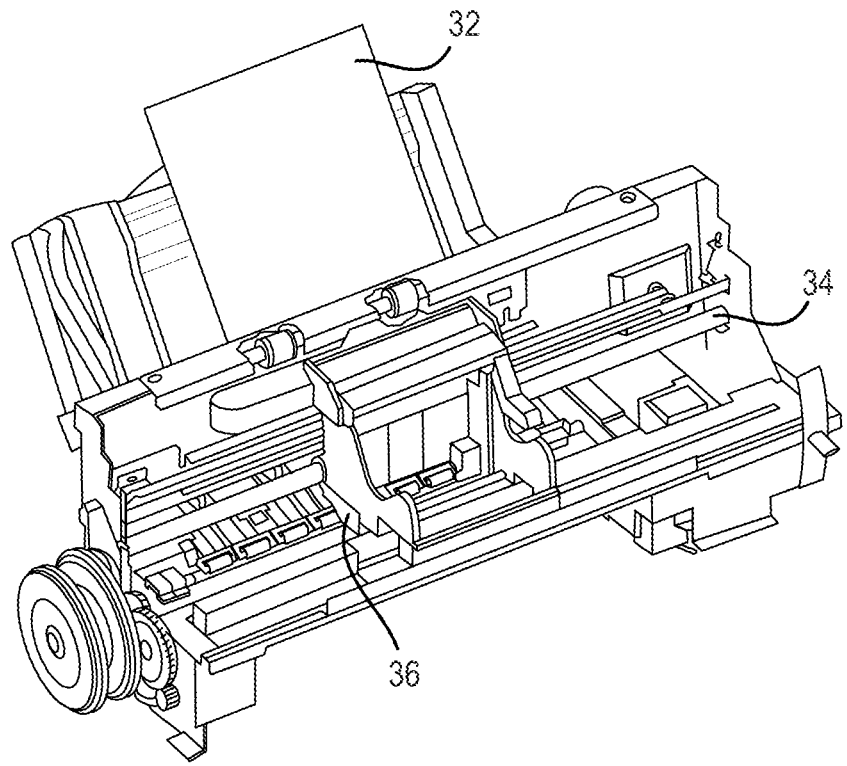
FIGS. 2A and 2B are diagrams schematically showing an example of an ink jet recording apparatus used in the ink jet recording method of the present invention.
Figure 2B:
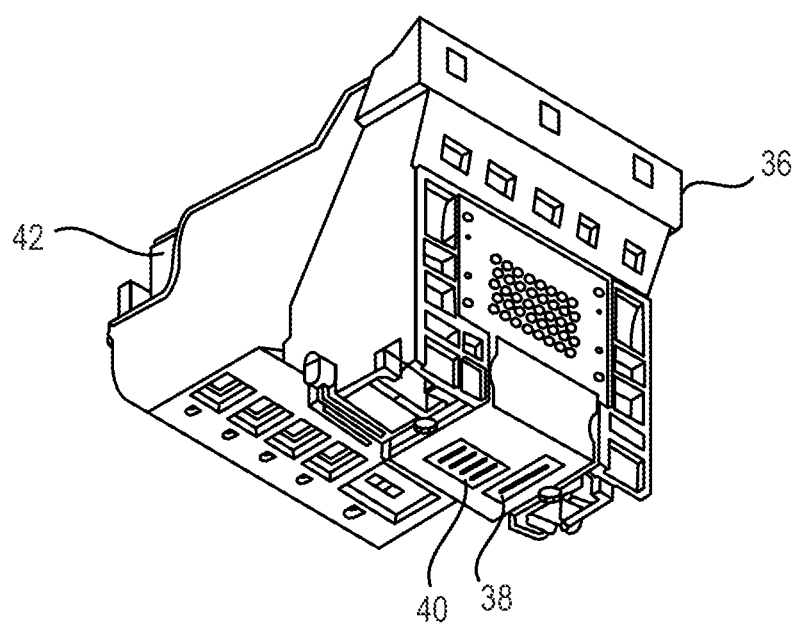

FIGS. 2A and 2B are diagrams schematically showing an example of an ink jet recording apparatus used in the ink jet recording method of the present invention. FIG. 2A is a perspective view of a main part of the ink jet recording apparatus and FIG. 2B is a perspective view of a head cartridge. The ink jet recording apparatus is provided with a conveying means (not shown) for conveying a recording medium 32 and a carriage shaft 34. A head cartridge 36 can be mounted on the carriage shaft 34. The head cartridge 36 includes recording heads 38 and 40, and is configured so that the ink cartridge 42 is set thereon. While the head cartridge 36 is conveyed along the carriage shaft 34 in the main scanning direction, ink (not shown) is ejected from the recording heads 38 and 40 toward the recording medium 32. Then, when the recording medium 32 is conveyed in the sub-scanning direction by a conveying means (not shown), an image is recorded on the recording medium 32.

EXAMPLES

Hereinafter, the present invention will be described in more detail with reference to examples and comparative examples, but the present invention is not limited in any way by the following examples to the extent that it does not go beyond the gist thereof "Part" and "%" are described as mass standards unless otherwise specified.

<Preparation of Resin (Resin Dispersant)?

Each monomer was polymerized according to a conventional method to obtain a composition ratio (mass ratio) of the units shown in Table 1, thereby synthesizing each resin. An aqueous solution of 10.0% potassium hydroxide in an amount corresponding to the acid value of each of resins was added to neutralize the resin and a solution containing each of resins was obtained. The acid values of resins are shown in Table 1. The acid value of a resin was measured by potentiometric titration with potassium hydroxide ethanol by using an automatic potentiometric titration apparatus. The abbreviations in Table 1 denote as follows.

St: styrene
nBA: n-butyl acrylate
BzA: benzyl acrylate
BzMA: benzyl methacrylate
AA: acrylic acid
MAA: methacrylic acid

TABLE 1

| | Composition ratio (mass ratio) of units constituting resin | | | | | | Weight average molecular weight | Acid value (mgKOH/g) |
|---|---|---|---|---|---|---|---|---|
| Resin | St | nBA | BzA | BzMA | AA | MAA | | |
| 1 | 83.9 | | | | 16.1 | | 8,000 | 125 |
| 2 | | 80.8 | | | | 19.2 | 8,000 | 125 |
| 3 | | | 92.3 | | 7.7 | | 32,000 | 60 |
| 4 | 32.6 | 33.5 | | | 33.9 | | 12,000 | 264 |

TABLE 1-continued

| Resin | Composition ratio (mass ratio) of units constituting resin | | | | | | Weight average molecular weight | Acid value (mgKOH/g) |
|---|---|---|---|---|---|---|---|---|
| | St | nBA | BzA | BzMA | AA | MAA | | |
| 5 | 78.1 | | | | 21.9 | | 8,000 | 170 |
| 6 | 78.8 | | | | 21.2 | | 10,000 | 165 |
| 7 | | 74.6 | | | | 25.4 | 10,000 | 165 |
| 8 | 78.8 | | | | 21.2 | | 6,000 | 165 |
| 9 | 78.8 | | | | 21.2 | | 8,000 | 165 |
| 10 | 78.8 | | | | 21.2 | | 9,100 | 165 |
| 11 | 78.8 | | | | 21.2 | | 12,000 | 165 |
| 12 | 85.2 | | | | 14.8 | | 10,000 | 115 |
| 13 | 83.9 | | | | 16.1 | | 10,000 | 125 |
| 14 | 82.6 | | | | 17.4 | | 10,000 | 135 |
| 15 | 76.2 | | | | 23.8 | | 10,000 | 185 |
| 16 | 85.2 | | | | 14.8 | | 6,000 | 115 |
| 17 | | | 91.6 | | 8.4 | | 34,000 | 65 |
| 18 | | | | 71.0 | 29.0 | | 7,500 | 226 |

<Preparation of Pigment Dispersion Liquid>

Each of pigment (16 parts), liquid containing the resin shown in Tables 2 to 4, and ion-exchanged water (100.0 parts in total) were mixed so that the PB ratio (mass ratio, pigment:resin (solid content)) was 10:3. Then the mixture was dispersed for 2 hours using a batch-type vertical Sandoz mill. For a pigment, C.I. Pigment Yellow 74 (PY 74), C.I. Pigment Yellow 138 (PY 138) or C.I. Pigment Yellow 128 (PY 128) was used. The dispersion-treated mixture thus obtained was centrifuged to remove a coarse particle and pressure-filtered through a microfilter with a pore size of 3.0 µm (manufactured by Fujifilm Corporation)) to obtain a pigment dispersion liquid containing 16.0% pigment. The cumulative 50% particle diameter in volume-based particle size distribution of each of obtained pigment dispersion liquids ($D50_A$, $D50_B$, $D50_C$) is shown in Tables 2 to 4. The cumulative 90% particle diameter in volume-based particle size distribution of each of the pigment dispersion liquids containing PY138 ($D90_B$) is shown in Table 3. A particle diameter of pigment in a pigment dispersion liquid was measured using a dynamic light scattering type nano particle diameter measuring device (product name: Nanotrac WaveII-EX150, manufactured by Microtrac BEL). The abbreviations in TABLES 2 to 4 denote as follows.

$D50_A$: Cumulative 50% particle diameter in volume-based particle size distribution of C.I. Pigment Yellow 74

$D50_B$: Cumulative 50% particle diameter in volume-based particle size distribution of C.I. Pigment Yellow 138

$D90_B$: Cumulative 90% particle diameter in volume-based particle size distribution of C.I. Pigment Yellow 138

$D50_C$: Cumulative 50% particle diameter in volume-based particle size distribution of C.I. Pigment Yellow 128

TABLE 2

| Pigment dispersion liquid containing PY74 | Type of resin | $D50_A$ (nm) |
|---|---|---|
| 1 | 1 | 84 |
| 2 | 2 | 84 |
| 3 | 1 | 50 |
| 4 | 1 | 142 |
| 5 | 1 | 100 |
| 6 | 1 | 69 |
| 7 | 1 | 65 |
| 8 | 1 | 150 |
| 9 | 3 | 93 |
| 10 | 4 | 130 |
| 11 | 5 | 130 |

TABLE 3

| Pigment dispersion liquid containing PY138 | Type of resin | $D50_B$ (nm) | $D90_B$ (nm) |
|---|---|---|---|
| 1 | 6 | 50 | 100 |
| 2 | 7 | 50 | 100 |
| 3 | 6 | 30 | 60 |
| 4 | 7 | 85 | 170 |
| 5 | 6 | 50 | 75 |
| 6 | 6 | 50 | 125 |
| 7 | 6 | 50 | 150 |
| 8 | 6 | 50 | 175 |
| 9 | 8 | 50 | 100 |
| 10 | 9 | 50 | 100 |
| 11 | 10 | 50 | 100 |
| 12 | 11 | 50 | 100 |
| 13 | 12 | 50 | 100 |
| 14 | 13 | 50 | 100 |
| 15 | 14 | 50 | 100 |
| 16 | 15 | 50 | 100 |
| 17 | 16 | 50 | 175 |
| 18 | 6 | 90 | 180 |
| 19 | 17 | 90 | 180 |
| 20 | 3 | 93 | 186 |
| 21 | 18 | 110 | 220 |
| 22 | 5 | 110 | 220 |

TABLE 4

| Pigment dispersion liquid containing PY128 | Type of resin | $D50_C$ (nm) |
|---|---|---|
| 1 | 1 | 84 |
| 2 | 1 | 50 |
| 3 | 18 | 110 |
| 4 | 5 | 110 |

<Preparation of Ink>

An ink was prepared by mixing the following components in the amount indicated, sufficiently stirring, and then subjecting the mixture to pressure filtration through a microfilter (manufactured by Fujifilm) having a pore size of 0.45 μm. The property of each of the prepared inks is shown in Table 5. In Table 5, "$C_A$" denotes "content of C.I. Pigment Yellow 74" and "$C_B$" denotes "content of resin B for dispersing C.I. Pigment Yellow 138". In Table 5, "$Mw_A$" denotes "weight average molecular weight of resin A for dispersing C.I. Pigment Yellow 74" and "$Mw_B$" denotes "weight average molecular weight of resin B for dispersing C.I. Pigment Yellow 138". "$An_A$" denotes "acid value of resin A for dispersing C.I. Pigment Yellow 74" and "$An_B$" denotes "acid value of resin B for dispersing C.I. Pigment Yellow 138". Composition of an ink listed in Table 5 was as follows.

A pigment dispersion liquid shown in Table 5: amount (%) shown as "amount used" in Table 5
Glycerin: 10.0%
Triethylene glycol: 5.0%
Acetylenol E100: 1.0%
Ion exchange water: remaining amount (%) in which the total of the components is 100.0%

<Evaluation>

An ink jet recording mounted with a recording head for ejecting ink by thermal energy (product name "PIXUS PRO-10S", manufactured by Canon) was prepared. An ink cartridge filled with each of the prepared inks was set in the ink jet recording apparatus. By using the ink jet recording apparatus, a solid image of 14 gradations whose recording duty was changed by 10% increments from 10 to 140% was recorded on a glossy paper (product name: Canon Photo Paper Glossy Gold GL-101, manufactured by Canon). In the present embodiment, an image recorded at a resolution of 600 dpi×600 dpi under a condition of applying 8 drops of ink of 3.8 ng to a unit area of 1/600 inch×1/600 inch is defined as recording duty of 100%. "C" was defined as an unacceptable level, "B" as an acceptable level, and "A" as an excellent level in the evaluation criteria for each of evaluation items shown below. The evaluation results are shown in Table 5.

(Color Developability)

A recorded matter obtained by recording an image was dried naturally for 24 hours and values of L*, a* and b* in the CIELab color space of the image with each of recording duties was measured using a spectrophotometer (product name "Spectrolino", manufactured by Gretag Macbeth). Then, a value of chroma $C^*=\{(a^*)^2+(b^*)^2\}^{1/2}$ was calculated, and color developability of the image was evaluated according to the following evaluation criteria.

A: C* value was 110 or more.
B: C* value was 100 or more to less than 110.
C: C* value was less than 100.

(Light Resistance)

A recorded matter obtained by recording an image was dried naturally for 24 hours. Then a spectral sensitivity characteristic of the image with each of recording duties was measured using a spectrophotometer (product name "Spectrolino", manufactured by Gretag Macbeth) to identify the recorded matter in which the image with optical density closest to 1.0 was recorded. The spectral sensitivity characteristic described above is an optical density of a yellow component defined by "ISO Status A". An identified recorded matter was placed into a light resistance test equipment (product name "Xenon Weather Meter X75SC", manufactured by Suga Tester). Then the recorded matter was irradiated with xenon light having a wavelength of 340 nm at an irradiation intensity of 0.39 W/(m²·nm) for 200 hours at a black panel temperature of 63° C. and a relative humidity of 70%. An optical density of the image after the above irradiation was remeasured, and by calculating "optical density remaining rate (%)" from the following equation (1), light resistance of the image was evaluated according to the following evaluation criteria.

Optical density retention (%)={(optical density after irradiation)/(optical density before irradiation)}×100    (1)

A: The optical density retention was 85% or more.
B: The optical density retention was 70% or more to less than 85%.
C: The optical density retention was less than 70%

TABLE 5

| | | Composition and characteristic of ink | | | | | | | | |
|---|---|---|---|---|---|---|---|---|---|---|
| | | Pigment dispersion liquid containing PY74 | | Pigment dispersion liquid containing PY138 | | Pigment dispersion liquid containing PY128 | | | | Value of $C_B/C_A$ (times) |
| | | Type | Amount used (%) | Type | Amount used (%) | Type | Amount used (%) | $C_A$(%) | $C_B$(%) | |
| Example | 1 | 1 | 15.6 | 1 | 15.6 | | | 2.50 | 2.50 | 1.00 |
| | 2 | 2 | 15.6 | 2 | 15.6 | | | 2.50 | 2.50 | 1.00 |
| | 3 | 2 | 15.6 | 1 | 15.6 | | | 2.50 | 2.50 | 1.00 |
| | 4 | 1 | 15.6 | 2 | 15.6 | | | 2.50 | 2.50 | 1.00 |
| | 5 | 3 | 15.6 | 3 | 15.6 | | | 2.50 | 2.50 | 1.00 |
| | 6 | 4 | 15.6 | 4 | 15.6 | | | 2.50 | 2.50 | 1.00 |
| | 7 | 5 | 15.6 | 1 | 15.6 | | | 2.50 | 2.50 | 1.00 |
| | 8 | 6 | 15.6 | 1 | 15.6 | | | 2.50 | 2.50 | 1.00 |
| | 9 | 1 | 29.9 | 1 | 1.3 | | | 4.78 | 0.21 | 0.04 |
| | 10 | 1 | 28.4 | 1 | 2.8 | | | 4.54 | 0.45 | 0.10 |
| | 11 | 1 | 2.8 | 1 | 28.1 | | | 0.45 | 4.50 | 10.00 |
| | 12 | 1 | 2.6 | 1 | 28.6 | | | 0.42 | 4.58 | 10.90 |
| | 13 | 1 | 15.6 | 5 | 15.6 | | | 2.50 | 2.50 | 1.00 |
| | 14 | 1 | 15.6 | 6 | 15.6 | | | 2.50 | 2.50 | 1.00 |
| | 15 | 1 | 15.6 | 7 | 15.6 | | | 2.50 | 2.50 | 1.00 |
| | 16 | 1 | 15.6 | 8 | 15.6 | | | 2.50 | 2.50 | 1.00 |
| | 17 | 1 | 15.6 | 9 | 15.6 | | | 2.50 | 2.50 | 1.00 |
| | 18 | 1 | 15.6 | 10 | 15.6 | | | 2.50 | 2.50 | 1.00 |

TABLE 5-continued

| | | | | | | | | | | |
|---|---|---|---|---|---|---|---|---|---|---|
| | 19 | 1 | 15.6 | 11 | 15.6 | | | 2.50 | 2.50 | 1.00 |
| | 20 | 11 | 15.6 | 12 | 15.6 | | | 2.50 | 2.50 | 1.00 |
| | 21 | 1 | 15.6 | 13 | 15.6 | | | 2.50 | 2.50 | 1.00 |
| | 22 | 1 | 15.6 | 14 | 15.6 | | | 2.50 | 2.50 | 1.00 |
| | 23 | 1 | 15.6 | 15 | 15.6 | | | 2.50 | 2.50 | 1.00 |
| | 24 | 1 | 15.6 | 16 | 15.6 | | | 2.50 | 2.50 | 1.00 |
| | 25 | 1 | 29.9 | 17 | 1.3 | | | 4.78 | 0.21 | 0.04 |
| Comparative example | 1 | | | 1 | 31.2 | | | 0.00 | 4.99 | — |
| | 2 | | | 1 | 15.6 | 1 | 15.6 | 0.00 | 2.50 | — |
| | 3 | 1 | 31.2 | | | | | 4.99 | 0.00 | 0.00 |
| | 4 | 1 | 15.6 | | | 2 | 15.6 | 2.50 | 0.00 | 0.00 |
| | 5 | 7 | 15.6 | 1 | 15.6 | | | 2.50 | 2.50 | 1.00 |
| | 6 | 8 | 15.6 | 18 | 15.6 | | | 2.50 | 2.50 | 1.00 |
| | 7 | | | 19 | 31.2 | | | 0.00 | 4.99 | — |
| | 8 | 9 | 10.4 | 20 | 20.8 | | | 1.66 | 3.33 | 2.01 |
| | 9 | 10 | 15.6 | | | 3 | 15.6 | 2.50 | 0.00 | 0.00 |
| | 10 | 10 | 15.6 | 21 | 15.6 | | | 2.50 | 2.50 | 1.00 |
| | 11 | 11 | 15.6 | | | 4 | 15.6 | 2.50 | 0.00 | 0.00 |
| | 12 | 11 | 15.6 | 22 | 15.6 | | | 2.50 | 2.50 | 1.00 |

| | | Composition and characteristic of ink | | | | | |
|---|---|---|---|---|---|---|---|
| | | Value of $D50_B/D50_A$ (times) | Value of $D90_B/D50_A$ (times) | Value of $Mw_B/Mw_A$ (times) | Value of $An_B/An_A$ (times) | Evaluation | |
| | | | | | | Color developability | Light resistance |
| Example | 1 | 0.60 | 2.00 | 1.3 | 1.3 | A | A |
| | 2 | 0.60 | 2.00 | 1.3 | 1.3 | A | A |
| | 3 | 0.60 | 2.00 | 1.3 | 1.3 | A | A |
| | 4 | 0.60 | 2.00 | 1.3 | 1.3 | A | A |
| | 5 | 0.60 | 2.00 | 1.3 | 1.3 | A | A |
| | 6 | 0.60 | 2.00 | 1.3 | 1.3 | A | A |
| | 7 | 0.50 | 2.00 | 1.3 | 1.3 | A | A |
| | 8 | 0.72 | 2.00 | 1.3 | 1.3 | A | A |
| | 9 | 0.60 | 2.00 | 1.3 | 1.3 | B | B |
| | 10 | 0.60 | 2.00 | 1.3 | 1.3 | A | A |
| | 11 | 0.60 | 2.00 | 1.3 | 1.3 | A | A |
| | 12 | 0.60 | 2.00 | 1.3 | 1.3 | B | A |
| | 13 | 0.60 | 1.50 | 1.3 | 1.3 | A | A |
| | 14 | 0.60 | 2.50 | 1.3 | 1.3 | A | A |
| | 15 | 0.60 | 3.00 | 1.3 | 1.3 | A | A |
| | 16 | 0.60 | 3.50 | 1.3 | 1.3 | B | B |
| | 17 | 0.60 | 2.00 | 0.8 | 1.3 | B | B |
| | 18 | 0,60 | 2.00 | 1.0 | 1.3 | A | A |
| | 19 | 0.60 | 2.00 | 1.1 | 1.3 | A | A |
| | 20 | 0.60 | 2.00 | 1.5 | 1.3 | A | A |
| | 21 | 0.60 | 2.00 | 1.3 | 0.9 | B | B |
| | 22 | 0.60 | 2.00 | 1.3 | 1.0 | A | A |
| | 23 | 0.60 | 2.00 | 1.3 | 1.1 | A | A |
| | 24 | 0.60 | 2.00 | 1.3 | 1.5 | A | A |
| | 25 | 0.60 | 3.50 | 0.8 | 0.9 | B | B |
| Comparative example | 1 | — | 2.00 | — | — | C | A |
| | 2 | — | 2.00 | — | — | C | A |
| | 3 | — | — | — | — | A | C |
| | 4 | — | — | — | — | A | C |
| | 5 | 0.77 | 2.00 | 1.3 | 1.3 | A | C |
| | 6 | 0.60 | 2.00 | 1.3 | 1.3 | C | A |
| | 7 | — | 2.00 | — | — | C | C |
| | 8 | 1.00 | 2.00 | 1.0 | 1.0 | C | C |
| | 9 | — | — | — | — | C | C |
| | 10 | 0.85 | 2.00 | 0.6 | 0.9 | C | C |
| | 11 | — | — | — | — | C | C |
| | 12 | 0.85 | 2.00 | 1.0 | 1.0 | C | C |

This application claims the benefit of Japanese Patent Application No. 2020-206947, filed Dec. 14, 2020, and Japanese Patent Application No. 2021-165638, filed Oct. 7, 2021, which are hereby incorporated by reference herein in their entirety.

What is claimed is:

1. An aqueous ink for ink jet recording comprising a plurality of pigments and a resin dispersant for dispersing the plurality of pigments, wherein the plurality of pigments comprises C.I. Pigment Yellow 74 and C.I. Pigment Yellow 138, wherein a cumulative 50% particle diameter in volume-based particle size distribution of the C.I. Pigment Yellow 138 is 85 nm or less, and wherein a ratio of the cumulative 50% particle diameter in volume-based particle size distribution of the C.I. Pigment Yellow 138 to a cumulative 50% particle diameter in volume-based particle size distribution of the C.I. Pigment Yellow 74 is 0.72 times or less.

2. The aqueous ink according to claim 1, wherein a ratio of a content (% by mass) of the C.I. Pigment Yellow 138 to a content (% by mass) of the C.I. Pigment Yellow 74 is 0.1 times or more to 10.0 times or less.

3. The aqueous ink according to claim 1, wherein a ratio of a cumulative 90% particle diameter in volume-based particle size distribution of the C.I. Pigment Yellow 138 to the cumulative 50% particle diameter in volume-based particle size distribution of the C.I. Pigment Yellow 138 is 3.00 times or less.

4. The aqueous ink according to claim 1, wherein the resin dispersant comprises a resin A for dispersing the C.I. Pigment Yellow 74 and a resin B for dispersing the C.I. Pigment Yellow 138,
wherein a ratio of a weight average molecular weight of the resin B to a weight average molecular weight of the resin A is 1.0 time or more.

5. The aqueous ink according to claim 1, wherein the resin dispersant comprises a resin A for dispersing the C.I. Pigment Yellow 74 and a resin B for dispersing the C.I. Pigment Yellow 138,
wherein the ratio of an acid value (mg KOH/g) of the resin B to an acid value (mg KOH/g) of the resin A is 1.0 time or more.

6. An ink cartridge comprising an ink and an ink storage portion for storing the ink, wherein the ink comprises the aqueous ink according to claim 1.

7. An ink jet recording method for recording an image on a recording medium by ejecting an ink from an ink jet recording head, wherein the ink comprises the aqueous ink according to claim 1.

8. The aqueous ink according to claim 1, wherein a cumulative 50% particle diameter in volume-based particle size distribution of the C.I. Pigment Yellow 138 is 30 nm or more to 60 nm or less.

9. The aqueous ink according to claim 1, wherein a cumulative 50% particle diameter in volume-based particle size distribution of the C.I. Pigment Yellow 138 is 40 nm or more to 60 nm or less.

10. The aqueous ink according to claim 1, wherein a cumulative 50% particle diameter in volume-based particle size distribution of the C.I. Pigment Yellow 74 is 50 nm or more to 145 nm or less.

11. The aqueous ink according to claim 1, wherein a ratio of the cumulative 50% particle diameter in volume-based particle size distribution of the C.I. Pigment Yellow 138 to a cumulative 50% particle diameter in volume-based particle size distribution of the C.I. Pigment Yellow 74 is 0.50 times or more.

12. The aqueous ink according to claim 1, wherein a ratio of a cumulative 90% particle diameter in volume-based particle size distribution of the C.I. Pigment Yellow 138 to the cumulative 50% particle diameter in volume-based particle size distribution of the C.I. Pigment Yellow 138 is 1.50 times or more to 2.50 times or less.

13. The aqueous ink according to claim 1, wherein a cumulative 90% particle diameter in volume-based particle size distribution of the C.I. Pigment Yellow 138 is 50 nm or more to 100 nm or less.

14. The aqueous ink according to claim 1, wherein a ratio of a content (% by mass) of the C.I. Pigment Yellow 138 to a content (% by mass) of the C.I. Pigment Yellow 74 is 1.0 time or more to 5.0 times or less.

15. The aqueous ink according to claim 1, wherein a content (% by mass) of the C.I. Pigment Yellow 74 based on the total mass of the ink is 0.1% by mass or more to 8.0% by mass or less.

16. The aqueous ink according to claim 1, wherein a content (% by mass) of the C.I. Pigment Yellow 138 based on the total mass of the ink is 0.1% by mass or more to 8.0% by mass or less.

17. The aqueous ink according to claim 4, wherein a ratio of a weight average molecular weight of the resin B to a weight average molecular weight of the resin A is 1.5 times or less.

18. The aqueous ink according to claim 5, wherein the ratio of an acid value (mg KOH/g) of the resin B to an acid value (mg KOH/g) of the resin A is 1.5 times or less.

19. The aqueous ink according to claim 1, wherein an acid value of the resin is 120 mg KOH/g or more to 350 mg KOH/g or less.

* * * * *